United States Patent
Wang et al.

(10) Patent No.: US 11,646,674 B2
(45) Date of Patent: May 9, 2023

(54) MULTI-LEVEL CONVERTER WITH TRIANGLE TOPOLOGY AND CONTROL METHOD THEREOF

(71) Applicant: Tsinghua University, Beijing (CN)

(72) Inventors: Kui Wang, Beijing (CN); Zedong Zheng, Beijing (CN); Lie Xu, Beijing (CN); Yongdong Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 50 days.

(21) Appl. No.: 17/535,637

(22) Filed: Nov. 25, 2021

(65) Prior Publication Data

US 2022/0181993 A1 Jun. 9, 2022

(30) Foreign Application Priority Data

Dec. 8, 2020 (CN) .......................... 202011443284.3

(51) Int. Cl.
*H02M 7/483* (2007.01)
*H02M 7/537* (2006.01)

(52) U.S. Cl.
CPC ......... *H02M 7/4835* (2021.05); *H02M 7/537* (2013.01); *H02M 7/4837* (2021.05)

(58) Field of Classification Search
CPC .......................... H02M 7/4835; H02M 7/4837
See application file for complete search history.

(56) References Cited

U.S. PATENT DOCUMENTS

| | | | | |
|---|---|---|---|---|
| 2011/0280052 A1* | 11/2011 | Al-Haddad | ......... | H02M 7/4837 363/84 |
| 2014/0369094 A1* | 12/2014 | Hosini | .................... | H02M 1/32 363/50 |
| 2016/0126827 A1* | 5/2016 | Dong | .................. | H02M 7/4835 363/50 |

FOREIGN PATENT DOCUMENTS

CN 101262180 B * 9/2011

* cited by examiner

*Primary Examiner* — Gary A Nash
(74) *Attorney, Agent, or Firm* — Hodgson Russ LLP

(57) ABSTRACT

The present disclosure provides a multi-level converter with triangle topology and control method thereof, related to the technical field of multi-level converters. In the converter, n DC capacitors connected in series form a vertical edge of a triangle and are as a DC bus, n switching tubes connected in series form a bevel edge of the triangle, switching tubes each connected between a neutral point of the DC bus corresponding to each layer and a point for connecting the switching tube on the bevel edge form a horizontal edge. Each time the layer is expanded by one, the number of levels increases by one. When a voltage across each capacitor is E, an AC output terminal Xn may output a total of n+1 levels.

18 Claims, 4 Drawing Sheets

MULTI-LEVEL CONVERTER WITH TRIANGLE TOPOLOGY AND CONTROL METHOD THEREOF

CROSS-REFERENCE TO RELATED APPLICATION

This application claims priority to Chinese Patent Application No. 202011443284.3, filed Dec. 8, 2020, the entire disclosure of which is incorporated herein by reference.

TECHNICAL FIELD

The present disclosure relates to the technical field of multi-level converters, and more particularly, to a multi-level converter with triangle topology and control method thereof.

BACKGROUND

Multi-level inverters (or DC-AC converters) have been widely concerned and applied in academia and industry since the multi-level inverters were proposed in 1981. Topologies that have been productized include diode-clamped three-level inverters, H-bridge cascaded multi-level inverters and modular multi-level inverters. The H-bridge cascaded multi-level inverter requires a large number of independent power supplies, which usually adopts a multi-winding phase-shifting transformer, thus the H-bridge cascaded multi-level inverter is not only large in volume, but also high in cost. The modular multi-level inverter is widely used in the field of voltage source converter based high voltage direct current transmission, but disadvantages of the modular multi-level inverter is large number of flying capacitors, large volume and high cost. The diode-clamped three-level inverter, because of having no demand for the flying capacitor and power supplying via a single DC power supply, adopts a small number of switching elements and has compact structure and highest power density (or gravimetric specific power) in all topologies. However, when extended to more levels, the diode-clamped topology has a problem that the number of the diodes increases sharply, which increases volume and cost of system. At the same time, the number of switches in an output loop being large also causes on-state loss of the system being large.

SUMMARY

According to a first aspect of the present disclosure, a multi-level converter with triangle topology is provided. The converter includes n capacitors and 2n switching tubes, configured for forming n layers of circuits. A first layer includes a first capacitor, a first switching tube and a second switching tube connected in sequence to form a first triangle, the first capacitor is provided on a first edge of the first triangle, the first switching tube is provided on a second edge of the first triangle, a second switching tube is provided on a third edge of the first triangle. A k-th layer includes a k-th capacitor, a (2k−1)-th switching tube and a 2k-th switching tube, and the k-th capacitor is connected in series to a first edge of the (k−1)-th triangle to form a first edge of a k-th triangle, a first terminal of the k-th capacitor is connected to a (k−1)-th capacitor; the (2k−1)-th switching tube is connected in series to the second edge of the (k−1)-th triangle to form a second edge of the k-th triangle, and a first terminal of the (2k−1)-th switching tube is connected to a (2k−3)-th switching tube; the 2k-th switching tube is connected between the k-th capacitor and the (2k−1)-th switching tube to form a third edge of the k-th triangle, and a first terminal of the 2k-th switching tube is connected to a second terminal of the k-th capacitor, and a second terminal of the 2k-th switching tube is connected to a second terminal of the (2k−1)-th switching tube and serves as a k-th AC output terminal; where n is a integer greater than 1, k=2, . . . , n.

According to a second aspect of the present disclosure, a control method of the multi-level converter with triangle topology is provided. The method includes: controlling turning on or turning off of two switching tubes in each layer in a complementary way, the (2k−3)-th switching tube is turned off prior to the (2k−1)-th switching tube, and the (2k−2)-th switching tube is turned on prior to the 2k-th switching tube; the (2k−1)-th switching tube is turned on prior to the (2k−3)-th switching tube, and the 2k-th switching tube is turned off prior to the (2k−2)-th switching tube; outputting a level of nE when all the switching tubes on the second edges from the first layer to the n-th layer are turned on and all switching tubes on the third edges from the first layer to the n-th layer are turned off; outputting a level of (n−k)E when k switching tubes on the second edges from the first layer to the k-th layer are turned off and (n−k) switching tubes on the second edges from the (k+1)-th layer to the n-th layer are turned on; outputting a level of 0 when all switching tubes on the second edges from the first layer to the n-th layer are turned off and all switching tubes on the third edges from the first layer to the n-th layer are turned on.

According to a third aspect of the present disclosure, a control method of the multi-level converter with triangle topology is provided. The method includes: controlling turning on or turning off of two switching tubes in each layer in a complementary way, the (2k−3)-th switching tube is turned off prior to the (2k−1)-th switching tube, and the (2k−2)-th switching tube is turned on prior to the 2k-th switching tube; the (2k−1)-th switching tube is turned on prior to the (2k−3)-th switching tube, and the 2k-th switching tube is turned off prior to the (2k−2)-th switching tube; outputting a level of 0 when all the switching tubes on the second edges from the first layer to the n-th layer are turned on and all switching tubes on the third edges from the first layer to the n-th layer are turned off; outputting a level of kE when k switching tubes on the second edges from the first layer to the k-th layer are turned off and (n−k) switching tubes on the second edges from the (n−k+1)-th layer to the n-th layer are turned on; outputting a level of nE when all switching tubes on the second edges from the first layer to the n-th layer are turned off and all switching tubes on the third edges from the first layer to the n-th layer are turned on.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
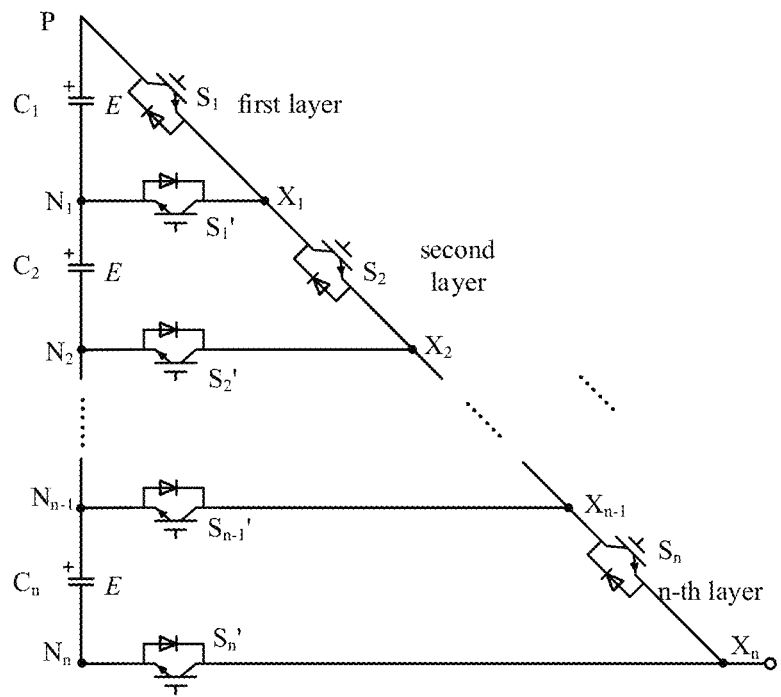
FIG. 1 is a schematic diagram of a circuit of a multi-level converter with positive triangle topology according to embodiments of the present disclosure.

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

A multi-level converter with triangle topology and control method thereof according to embodiments of the present disclosure are described with reference to the accompany drawings.

The multi-level converter with triangle topology of the present disclosure includes n capacitors and 2n switching tubes, configured for forming n layers of circuits.

A first layer includes a first capacitor, a first switching tube and a second switching tube connected in sequence to form a first triangle, the first capacitor is provided on a first edge of the first triangle, the first switching tube is provided on a second edge of the first triangle, a second switching tube is provided on a third edge of the first triangle.

A k-th layer includes a k-th capacitor, a (2k−1)-th switching tube and a 2k-th switching tube. The k-th capacitor is connected in series to a first edge of the (k−1)-th triangle to form a first edge of a k-th triangle, a first terminal of the k-th capacitor is connected to a (k−1)-th capacitor; the (2k−1)-th switching tube is connected in series to the second edge of the (k−1)-th triangle to form a second edge of the k-th triangle, and a first terminal of the (2k−1)-th switching tube is connected to a (2k−3)-th switching tube; the 2k-th switching tube is connected between the k-th capacitor and the (2k−1)-th switching tube to form a third edge of the k-th triangle, and a first terminal of the 2k-th switching tube is connected to a second terminal of the k-th capacitor, and a second terminal of the 2k-th switching tube is connected to a second terminal of the (2k−1)-th switching tube and serves as a k-th AC output terminal; where n is a integer greater than 1, k=2, . . . , n.

In some embodiments, n capacitors connected in series are as a DC bus, when a voltage across each capacitor is E, the n-th AC output terminal is configured to output a total of n+1 levels of 0, E, 2E, . . . , nE.

In some embodiments, the triangle is a positive triangle, a collector of the first switching tube is connected to a positive pole of the first capacitor, and an emitter of the second switching tube is connected to a negative pole of the first capacitor, a collector of the second switching tube is connected to an emitter of the first switching tube and serves as the first AC output terminal.

In some embodiments, the triangle is a positive triangle, the k-th capacitor is connected in series to a first edge of a (k−1)-th positive triangle towards downward, and a positive pole of the k-th capacitor is connected to a negative pole of the (k−1)-th capacitor; the (2k−1)-th switching tube (S2) is connected in series to a second edge of a (k−1)-th positive triangle towards downward, and a collector of the (2k−1)-th switching tube is connected to an emitter of the (2k−3)-th switching tube; an emitter of the 2k-th switching tube is connected to a negative pole of the (k−1)-th capacitor, and a collector of the 2k-th switching tube is connected to an emitter of the (2k−1)-th switching tube and serves as the k-th AC output terminal.

In some embodiments, the triangle is an inverted triangle, an emitter of the first switching tube is connected to a negative pole of the first capacitor, and a collector of the second switching tube is connected to a positive pole of the first capacitor, an emitter of the second switching tube is connected to a collector of the first switching tube and serves as the first AC output terminal.

In some embodiments, the triangle is an inverted triangle, the k-th capacitor is connected in series to a first edge of a (k−1)-th inverted triangle towards upward, and a negative pole of the k-th capacitor is connected to a positive pole of the (k−1)-th capacitor; the (2k−1)-th switching tube is connected in series to a second edge of the (k−1)-th inverted triangle towards upward, and an emitter of the (2k−1)-th switching tube is connected to a collector of the (2k−3)-th switching tube; a collector of the 2k-th switching tube is connected to a positive pole of the k-th capacitor, and an emitter of the 2k-th switching tube is connected to a collector of the (2k−1)-th switching tube and serves as the k-th AC output terminal.

In some embodiments, each switching tube provided on the third edge of each layer in the multi-level converter with positive triangle topology is configured as retaining its anti-parallel diode, and the converter includes an inductor and a DC input power supply, the inductor is connected in series to the n-th AC output terminal and then is connected to a negative pole of the DC input power supply, a positive pole of the DC input power supply is connected to a positive pole of the DC bus; the positive pole and a negative pole of the DC bus are serves as a DC output port, and input voltage and output voltage correspond to a same positive pole.

In some embodiments, each switching tube provided on the third edge of each layer in the multi-level converter with positive triangle topology is configured as retaining its anti-parallel diode, and the converter includes an inductor and a DC output capacitor, the inductor is connected in series to the n-th AC output terminal and then is connected to a positive pole of the DC output capacitor, a negative pole of the DC output capacitor is connected to a negative pole of the DC bus; a positive pole and the negative pole of the DC bus are serves as a DC input port, and input voltage and output voltage correspond to a same negative pole.

In some embodiments, each switching tube provided on the third edge of each layer in the multi-level converter with inverted triangle topology is configured as retaining its anti-parallel diode, and the converter includes an inductor and a DC input power supply, the inductor is connected in series to the n-th AC output terminal and then is connected to a positive pole of the DC input power supply, a negative pole of the DC input power supply is connected to a negative pole of the DC bus; a positive pole and the negative pole of the DC bus are serves as a DC output port, and input voltage and output voltage correspond to a same negative pole.

In some embodiments, each switching tube provided on the third edge of each layer in the multi-level converter with inverted triangle topology is configured as retaining its anti-parallel diode, and the converter includes an inductor and a DC output capacitor, the inductor is connected in series to the n-th AC output terminal and then is connected to a negative pole of the DC output capacitor, a positive pole of the DC output capacitor is connected to a positive pole of the DC bus; the positive pole and a negative pole of the DC bus are serves as a DC input port, and input voltage and output voltage correspond to a same positive pole.

In some embodiments, two switching tubes in each layer are controlled in a complementary way. Controlling two switching tubes in the complementary way means that one switching tube is turned on when the other switching tube is turned off, and one switching tube is turned off when the other switching tube is turned on.

In some embodiments, the (2k−3)-th switching tube is turned off prior to the (2k−1)-th switching tube, and the (2k−2)-th switching tube is turned on prior to the 2k-th switching tube; the (2k−1)-th switching tube is turned on prior to the (2k−3)-th switching tube, and the 2k-th switching tube is turned off prior to the (2k−2)-th switching tube.

In some embodiments, the triangle is a positive triangle, the level is output as nE when all the switching tubes on the second edges from the first layer to the n-th layer are turned on and all switching tubes on the third edges from the first layer to the n-th layer are turned off; the level is output as (n−k)E when k switching tubes on the second edges from the first layer to the k-th layer are turned off and (n−k) switching tubes on the second edges from the (k+1)-th layer to the n-th layer are turned on; the level is output as 0 when all switching tubes on the second edges from the first layer to the n-th layer are turned off and all switching tubes on the third edges from the first layer to the n-th layer are turned on.

In some embodiments, the triangle is an inverted triangle, the level is output as 0 when all the switching tubes on the second edges from the first layer to the n-th layer are turned on and all switching tubes on the third edges from the first layer to the n-th layer are turned off; the level is output as kE when k switching tubes on the second edges from the first layer to the k-th layer are turned off and (n−k) switching tubes on the second edges from the (n−k+1)-th layer to the n-th layer are turned on; the level is output as nE when all switching tubes on the second edges from the first layer to the n-th layer are turned off and all switching tubes on the third edges from the first layer to the n-th layer are turned on.

In some embodiments, the triangle is a positive triangle. The control method includes: controlling turning on or turning off of two switching tubes in each layer in a complementary way, the (2k−3)-th switching tube is turned off prior to the (2k−1)-th switching tube, and the (2k−2)-th switching tube is turned on prior to the 2k-th switching tube; the (2k−1)-th switching tube is turned on prior to the (2k−3)-th switching tube, and the 2k-th switching tube is turned off prior to the (2k−2)-th switching tube; outputting a level of nE when all the switching tubes on the second edges from the first layer to the n-th layer are turned on and all switching tubes on the third edges from the first layer to the n-th layer are turned off; outputting a level of (n−k)E when k switching tubes on the second edges from the first layer to the k-th layer are turned off and (n−k) switching tubes on the second edges from the (k+1)-th layer to the n-th layer are turned on; outputting a level of 0 when all switching tubes on the second edges from the first layer to the n-th layer are turned off and all switching tubes on the third edges from the first layer to the n-th layer are turned on.

In some embodiments, the triangle is an inverted triangle. The control method includes: controlling turning on or turning off of two switching tubes in each layer in a complementary way, the (2k−3)-th switching tube is turned off prior to the (2k−1)-th switching tube, and the (2k−2)-th switching tube is turned on prior to the 2k-th switching tube; the (2k−1)-th switching tube is turned on prior to the (2k−3)-th switching tube, and the 2k-th switching tube is turned off prior to the (2k−2)-th switching tube; outputting a level of 0 when all the switching tubes on the second edges from the first layer to the n-th layer are turned on and all switching tubes on the third edges from the first layer to the n-th layer are turned off; outputting a level of kE when k switching tubes on the second edges from the first layer to the k-th layer are turned off and (n−k) switching tubes on the second edges from the (n−k+1)-th layer to the n-th layer are turned on; outputting a level of nE when all switching tubes on the second edges from the first layer to the n-th layer are turned off and all switching tubes on the third edges from the first layer to the n-th layer are turned on.

With reference to FIGS. 1-6, the multi-level converter with triangle topology and control method thereof according to embodiments of the present disclosure are described in detail below.

The multi-level converter with triangle topology of the present disclosure includes a two-level half bridge circuit, as the first layer. The two-level half bridge circuit includes a first capacitor (C1) being a vertical edge (or a first edge) of a triangle, a first switching tube (S1) being a bevel edge (or a second edge) of the triangle, a second switching tube (S1') being a horizontal edge (or a third edge) of the triangle, and an AC output terminal X1.

A second capacitor (C2) is connected in series to the vertical edge of the triangle, and connected to the first capacitor (C1).

A third switching tube (S2) is connected in series to the bevel edge of the triangle, and connected to the first switching tube (S1). A fourth switching tube (S2') is connected between the Second capacitor (C2) and the third switching tube (S2) to form a new horizontal edge, and the fourth switching tube (S2') is connected to the Second capacitor (C2), and the fourth switching tube (S2') is connected to the third switching tube (S2) and serves as a new AC output terminal X2.

A structure of n layers of circuits is generated by repeating the foregoing process. In the n layers structure, n DC capacitors connected in series are as a DC bus where n may be an integer greater than 1. When a voltage across each capacitor is E, an AC output terminal Xn may output a total of n+1 levels, such as 0, E, 2E, . . . , nE.

In some embodiments of the present disclosure, the triangle may be a positive triangle. The Second capacitor (C2) is connected in series to a vertical edge of the positive triangle towards downward, and a positive pole of the Second capacitor (C2) is connected to a negative pole of the first capacitor (C1). The third switching tube (S2) is connected in series to a bevel edge of the positive triangle towards downward, and a collector of the third switching tube (S2) is connected to an emitter of the first switching tube (S1). The fourth switching tube (S2') is connected between a negative pole of the Second capacitor (C2) and an emitter of the third switching tube (S2) to form a new horizontal edge, and an emitter of the fourth switching tube (S2') is connected to the negative pole of the Second capacitor (C2), and a collector of the fourth switching tube (S2') is connected to the emitter of the third switching tube (S2) and serves as a new AC output terminal X2.

In detail, as illustrated in FIG. 1, in a circuit of a multi-level converter with positive triangle topology. The two-level half bridge circuit is taken as the first layer, the capacitance C1 of the half bridge circuit is the vertical edge of the positive triangle, the upper tube S1 is the bevel edge, the lower tube S1' is the horizontal edge, and the AC output terminal is X1. In order to expand to higher levels, more layers requires to be extended based on the positive triangle. The Second capacitor C2 is first connected in series to the vertical edge of the positive triangle towards downward, and the positive pole of the Second capacitor C2 is connected to the negative pole of the first capacitor C1. The switching tube S2 is connected in series to the bevel edge of the positive triangle towards downward, and the collector of the switching tube S2 is connected to the emitter of the switching tube S1. The switching tube S2' is connected between the negative pole of the Second capacitor C2 and the emitter of the switching tube S2 to form the new horizontal edge, and the emitter of the switching tube S2' is connected to the negative pole of the Second capacitor C2, and the collector of the switching tube S2' is connected to the emitter of the switching tube S2 and serves as the new AC output terminal X2. And so on may continue to expand to more layers. Each time the layer is expanded by one, the number of levels of output voltage increases by one, and one DC capacitor and two switching tubes are added at the same time. For the structure of n layers of circuits, n DC capacitors connected in series are as a DC bus. When the voltage across each capacitor is E, the AC output terminal Xn may output a total of n+1 levels, such as 0, E, 2E, ..., nE.

In some embodiments of the present disclosure, all switching tubes on all horizontal edges of the multi-level converter with positive triangle topology retain their anti-parallel diodes D1'-Dn', and an inductor is connected in series to the AC output terminal Xn and then is connected to a negative pole of a DC input power supply, a positive pole of the DC input power supply is connected to a positive pole of the DC bus. A circuit of a multi-level boost converter with positive triangle topology is therefore generated. Positive and negative poles of the DC bus are serves as a DC output port, and input voltage and output voltage correspond to a same positive pole.

Figure 2:
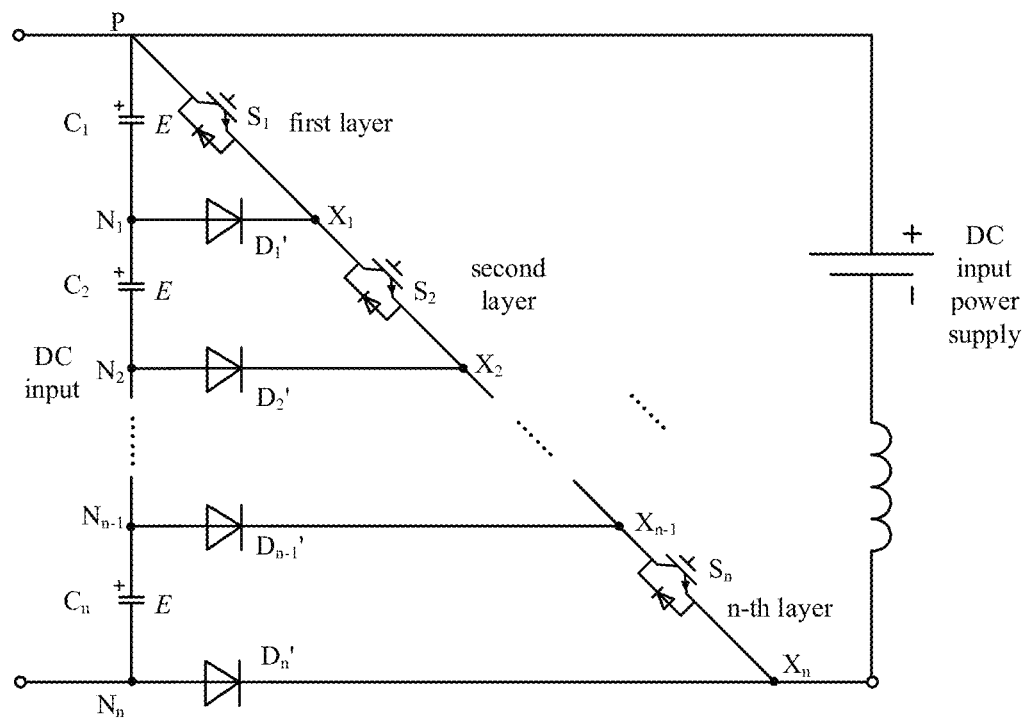
FIG. 2 is a schematic diagram of a circuit of a multi-level boost converter with positive triangle topology according to embodiments of the present disclosure.

In detail, all switching tubes S1'-Sn' on all horizontal edges of the multi-level converter with positive triangle topology illustrated in FIG. 1 retain their anti-parallel diodes D1'-Dn', and the inductor is connected in series to the AC output terminal Xn and then is connected to the negative pole of the DC input power supply, the positive pole of the DC input power supply is connected to the positive pole P of the DC bus. The circuit of the multi-level boost converter with positive triangle topology as illustrated in FIG. 2 may therefore be generated. The positive pole P and the negative pole Nn of the DC bus are serves as the DC output port, and the input voltage and the output voltage correspond to the same positive pole.

In some embodiments of the present disclosure, all switching tubes on all horizontal edges of the multi-level converter with positive triangle topology retain their anti-parallel diodes D1'-Dn', and an inductor is connected in series to the AC output terminal Xn and then is connected to a positive pole of a DC output capacitor, a negative pole of the DC output capacitor is connected to a negative pole of the DC bus. A circuit of a multi-level buck converter with positive triangle topology is therefore generated. Positive and negative poles of the DC bus are serves as a DC input port, and input voltage and output voltage correspond to a same negative pole.

Figure 3:
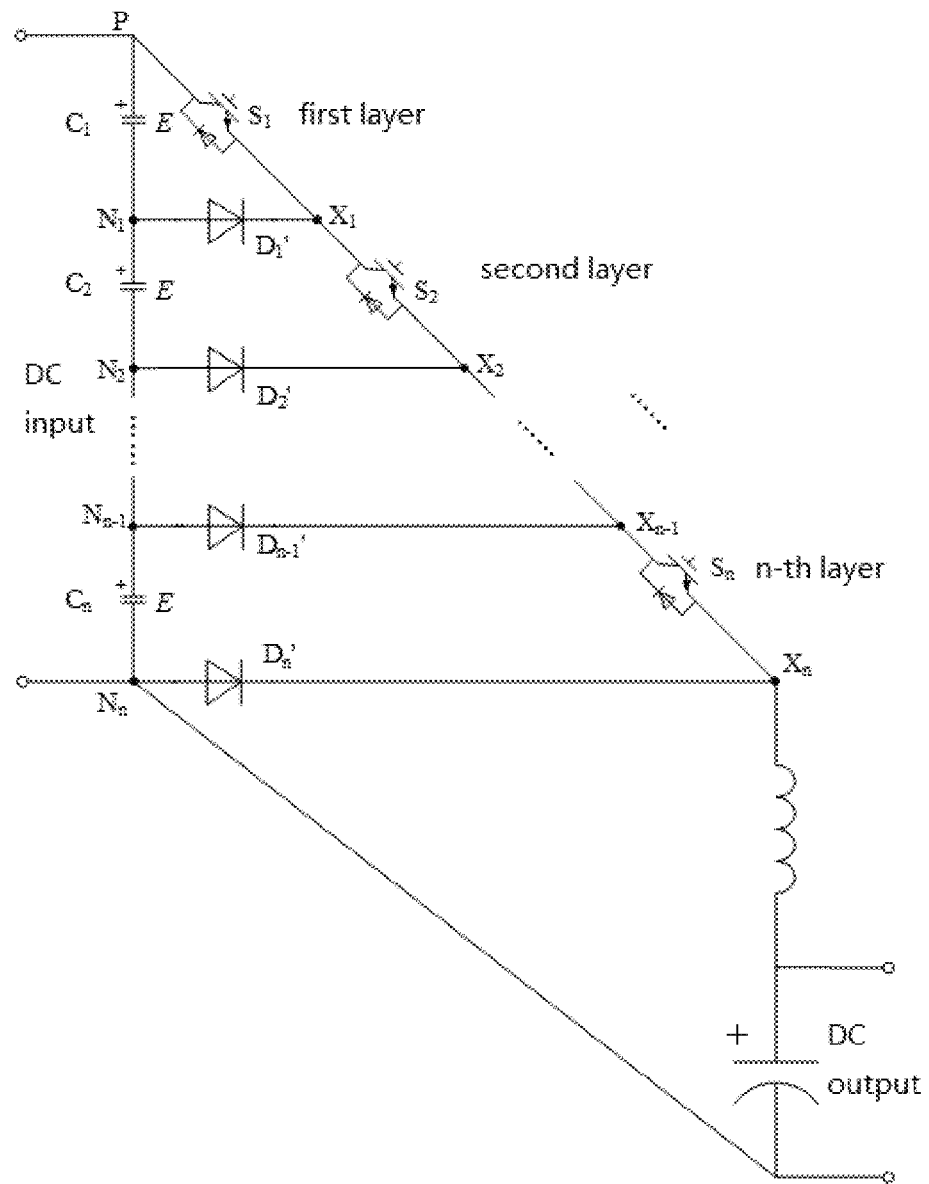
FIG. 3 is a schematic diagram of a circuit of a multi-level buck converter with positive triangle topology according to embodiments of the present disclosure.

In detail, all switching tubes S1'-Sn' on all horizontal edges of the multi-level converter with positive triangle topology illustrated in FIG. 1 retain their anti-parallel diodes D1'-Dn', and the inductor is connected in series to the AC output terminal Xn and then is connected to the positive pole of the DC output capacitor, the negative pole of the DC input power supply is connected to the negative pole Nn of the DC bus. The circuit of the multi-level buck converter with positive triangle topology as illustrated in FIG. 3 may therefore be generated. The positive pole P and the negative pole Nn of the DC bus are serves as the DC input port, and the input voltage and the output voltage correspond to the same negative pole.

In embodiments of the present disclosure, the first switching tube (S1) and the second switching tube (S1') are complementary, the third switching tube (S2) and the fourth switching tube (S2') are complementary, ..., the n-th switching tube (Sn) and the (n+1)-th switching tube (Sn') are complementary. The first switching tube (S1) is turned off prior to the third switching tube (S2), and the third switching tube (S2) is turned off prior to the fifth switching tube (S3), ..., the (n−1)-th switching tube (Sn−1) is turned off prior to the n-th switching tube (Sn). The third switching tube (S2) is turned on prior to the first switching tube (S1), the fifth switching tube (S3) is turned on prior to the third switching tube (S2), ..., the n-th switching tube is turned on prior to the (n−1)-th switching tube. The level is output as nE when all the switching tubes are turned on, the level is output as (n−1)E when the first switching tube (S1) is turned off, the level is output as (n−2)E when the first switching tube (S1) and the third switching tube (S2) are turned off, ..., the level is output as (n−k)E (k=1, 2, ..., n) when switching tubes S1-Sk is turned off, and the level is output as 0 when all switching tubes are turned off.

In some embodiments of the present disclosure, the triangle may be an inverted triangle. The Second capacitor (C2) is connected in series to a vertical edge of the inverted triangle towards upward, and a negative pole of the Second capacitor (C2) is connected to a positive pole of the first capacitor (C1). The third switching tube (S2) is connected in series to a bevel edge of the inverted triangle towards upward, and an emitter of the third switching tube (S2) is connected to a collector of the first switching tube (S1). The fourth switching tube (S2') is connected between a positive pole of the Second capacitor (C2) and a collector of the third switching tube (S2) to form a new horizontal edge, and a collector of the fourth switching tube (S2') is connected to the positive pole of the Second capacitor (C2), and an emitter of the fourth switching tube (S2') is connected to the collector of the third switching tube (S2) and serves as a new AC output terminal X2.

Figure 4:
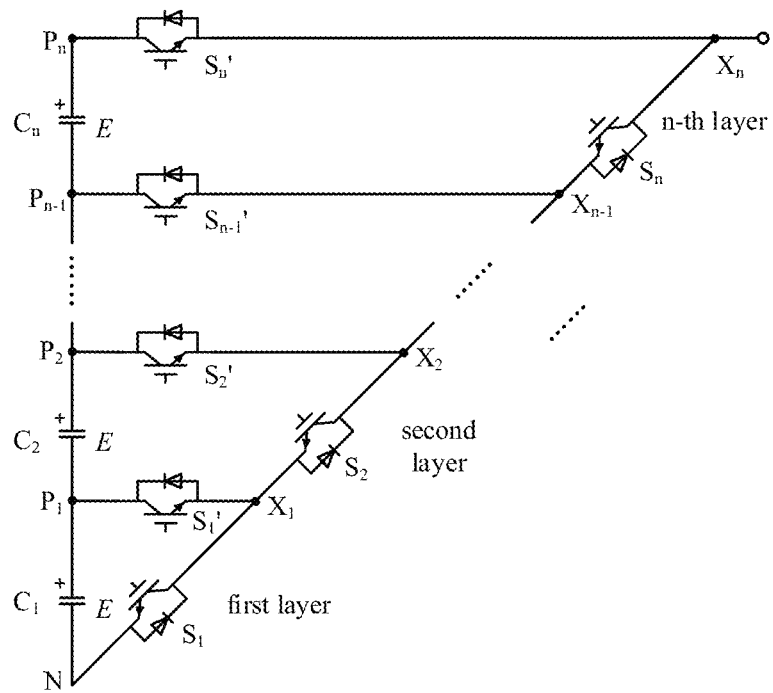
FIG. 4 is a schematic diagram of a circuit of a multi-level converter with inverted triangle topology according to embodiments of the present disclosure.

In detail, as illustrated in FIG. 4, in a circuit of a multi-level converter with inverted triangle topology. The two-level half bridge circuit is taken as the first layer, the capacitance C1 of the half bridge circuit is the vertical edge of the inverted triangle, the lower tube S1 is the bevel edge, the upper tube S1' is the horizontal edge, and the AC output terminal is X1. In order to expand to higher levels, more layers requires to be extended based on the inverted triangle. The Second capacitor C2 is first connected in series to the vertical edge of the inverted triangle towards upward, and the negative pole of the Second capacitor C2 is connected to the positive pole of the first capacitor C1. The switching tube S2 is connected in series to the bevel edge of the inverted triangle towards upward, and the emitter of the switching tube S2 is connected to the collector of the switching tube S1. The switching tube ST is connected between the positive pole of the Second capacitor C2 and the collector of the switching tube S2 to form the new horizontal edge, and the collector of the switching tube ST is connected to the positive pole of the Second capacitor C2, and the emitter of the switching tube ST is connected to the collector of the switching tube S2 and serves as the new AC output terminal X2. And so on may continue to expand to more layers. Each time the layer is expanded by one, the number of levels of output voltage increases by one, and one DC capacitor and two switching tubes are added at the same time. For the structure of n layers of circuits, n DC capacitors connected in series are as a DC bus. When the voltage across each capacitor is E, the AC output terminal Xn may output a total of n+1 levels, such 0, E, 2E, ..., nE.

In some embodiments of the present disclosure, all switching tubes on all horizontal edges of the multi-level converter with inverted triangle topology retain their anti-parallel diodes D1'-Dn', and an inductor is connected in series to the AC output terminal Xn and then is connected to a positive pole of a DC input power supply, a negative pole of the DC input power supply is connected to a negative pole of the DC bus. A circuit of a multi-level boost converter with inverted triangle topology is therefore generated. Positive and negative poles of the DC bus are serves as a DC output port, and input voltage and output voltage correspond to a same negative pole.

Figure 5:
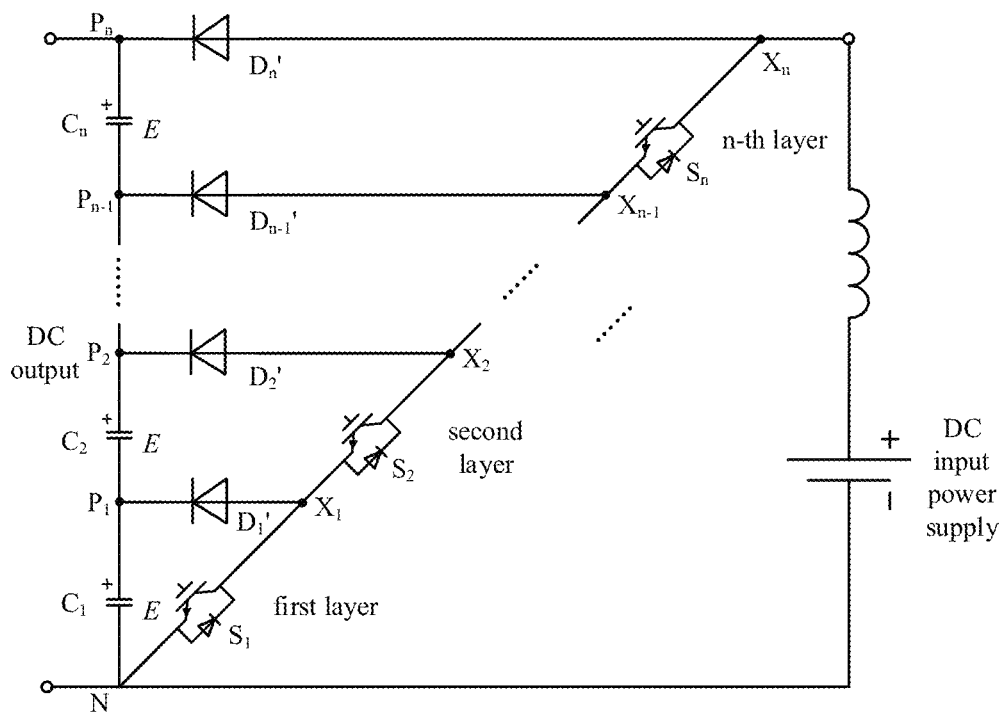
FIG. 5 is a schematic diagram of a circuit of a multi-level boost converter with inverted triangle topology according to embodiments of the present disclosure.

In detail, all switching tubes S1'-Sn' on all horizontal edges of the multi-level converter with inverted triangle topology illustrated in FIG. 4 retain their anti-parallel diodes D1'-Dn', and the inductor is connected in series to the AC output terminal Xn and then is connected to the positive pole of the DC input power supply, the negative pole of the DC input power supply is connected to the negative pole N of the DC bus. The circuit of the multi-level boost converter with inverted triangle topology as illustrated in FIG. 5 may therefore be generated. The positive pole Pn and the negative pole N of the DC bus are serves as the DC output port, and the input voltage and the output voltage correspond to the same negative pole.

In some embodiments of the present disclosure, all switching tubes on all horizontal edges of the multi-level converter with inverted triangle topology retain their anti-parallel diodes D1'-Dn', and an inductor is connected in series to the AC output terminal Xn and then is connected to a negative pole of a DC output capacitor, a positive pole of the DC output capacitor is connected to a positive pole of the DC bus. A circuit of a multi-level buck converter with inverted triangle topology is therefore generated. Positive and negative poles of the DC bus are serves as a DC input port, and input voltage and output voltage correspond to a same positive pole.

Figure 6:
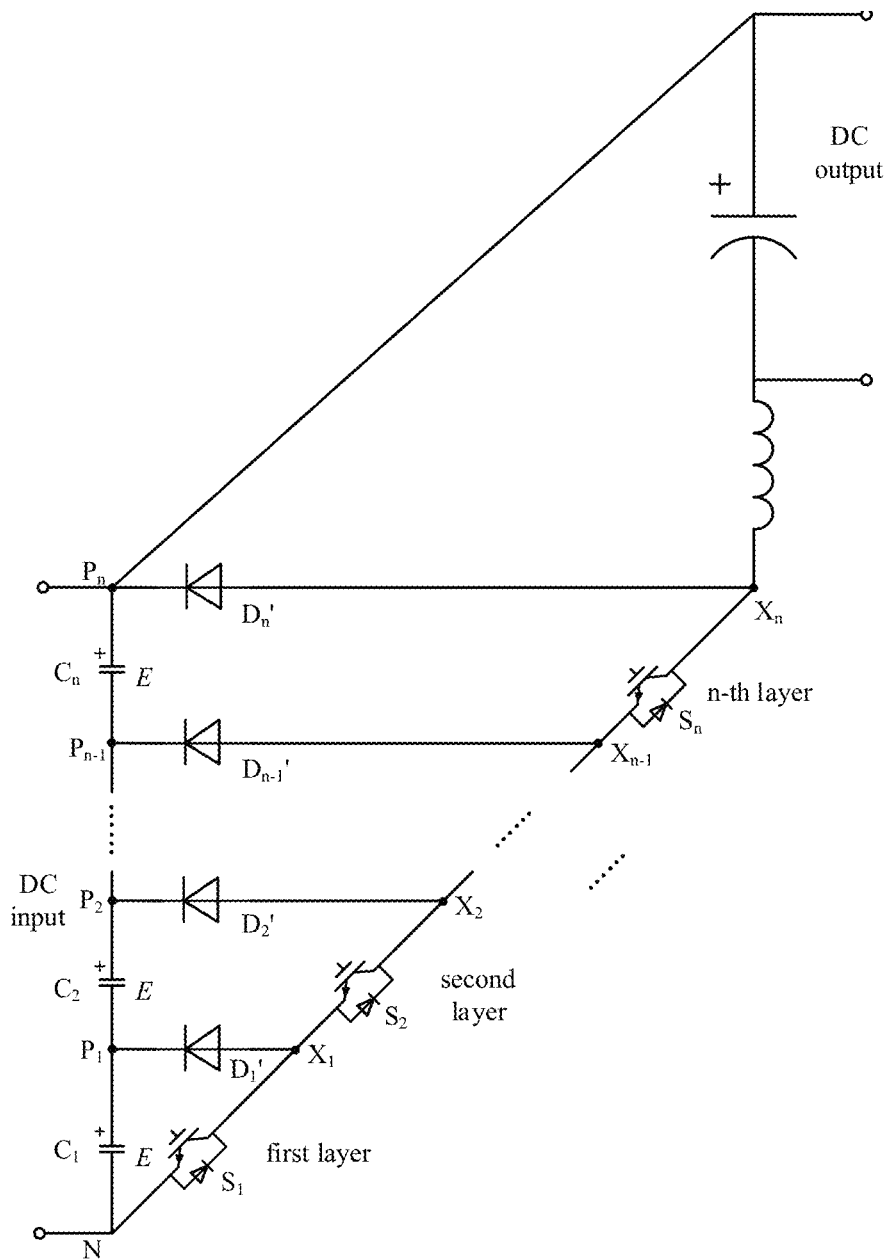
FIG. 6 is a schematic diagram of a circuit of a multi-level buck converter with inverted triangle topology according to embodiments of the present disclosure.

In detail, all switching tubes S1'-Sn' on all horizontal edges of the multi-level converter with inverted triangle topology illustrated in FIG. 4 retain their anti-parallel diodes D1'-Dn', and the inductor is connected in series to the AC output terminal Xn and then is connected to the negative pole of the DC output capacitor, the positive pole of the DC input power supply is connected to the positive pole Pn of the DC bus. The circuit of the multi-level buck converter with inverted triangle topology as illustrated in FIG. 6 may therefore be generated. The positive pole Pn and the negative pole N of the DC bus are serves as the DC input port, and the input voltage and the output voltage correspond to the same positive pole.

Therefore, the multi-level converter with inverted triangle topology and the multi-level converter with positive triangle topology may be further simplified into multi-level buck circuit or multi-level boost circuit to realize unidirectional non-isolated DC/DC conversion.

In embodiments of the present disclosure, the first switching tube (S1) and the second switching tube (S1') are complementary, the third switching tube (S2) and the fourth switching tube (S2') are complementary, ..., the n-th switching tube (Sn) and the (n+1)-th switching tube (Sn') are complementary. The first switching tube (S1) is turned off prior to the third switching tube (S2), and the third switching tube (S2) is turned off prior to the fifth switching tube (S3), ..., the (n−1)-th switching tube (Sn−1) is turned off prior to the n-th switching tube (Sn). The third switching tube (S2) is turned on prior to the first switching tube (S1), the fifth switching tube (S3) is turned on prior to the third switching tube (S2), ..., the n-th switching tube is turned on prior to the (n−1)-th switching tube. The level is output as 0 when all the switching tubes are turned on, the level is output as E when the first switching tube (S1) is turned off, the level is output as 2E when the first switching tube (S1) and the third switching tube (S2) are turned off, ..., the level is output as kE (k=1, 2, ..., n) when switching tubes S1-Sk is turned off, and the level is output as nE when all switching tubes are turned off.

The circuit adopts a small number of elements, has no demand for flying capacitors, which may improve efficiency for system and reduce cost.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, schematic representations of the above terms are not necessarily referring to the same embodiment or example. Furthermore, the particular features, structures, materials, or characteristics may be combined in any suitable manner in one or more embodiments or examples. In addition, without contradiction, different embodiments or examples and the features of the different embodiments or examples described in this specification can be combined and assorted by those skilled in the art.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discretely logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments are exemplary and cannot be construed to limit the present disclosure, and changes, revisions, alternatives, and modifications can be made in the embodiments within scope of the present disclosure.

What is claimed is:

1. A multi-level converter with triangle topology, comprising:
n capacitors and 2n switching tubes, configured for forming n layers of circuits, wherein:
a first layer comprises a first capacitor, a first switching tube and a second switching tube connected in sequence to form a first triangle, the first capacitor is provided on a first edge of the first triangle, the first switching tube is provided on a second edge of the first triangle, a second switching tube is provided on a third edge of the first triangle;
a k-th layer comprises a k-th capacitor, a $(2k-1)$-th switching tube and a 2k-th switching tube, wherein the k-th capacitor is connected in series to a first edge of the $(k-1)$-th triangle to form a first edge of a k-th triangle, a first terminal of the k-th capacitor is connected to a $(k-1)$-th capacitor; the $(2k-1)$-th switching tube is connected in series to the second edge of the $(k-1)$-th triangle to form a second edge of the k-th triangle, and a first terminal of the $(2k-1)$-th switching tube is connected to a $(2k-3)$-th switching tube; the 2k-th switching tube is connected between the k-th capacitor and the $(2k-1)$-th switching tube to form a third edge of the k-th triangle, and a first terminal of the 2k-th switching tube is connected to a second terminal of the k-th capacitor, and a second terminal of the 2k-th switching tube is connected to a second terminal of the $(2k-1)$-th switching tube and serves as a k-th AC output terminal; where n is a integer greater than 1, k=2, . . . , n.

2. The multi-level converter with triangle topology according to claim 1, wherein n capacitors connected in series are as a DC bus,
when a voltage across each capacitor is E, the n-th AC output terminal is configured to output a total of n+1 levels of 0, E, 2E, . . . , nE.

3. The multi-level converter with triangle topology according to claim 2, wherein the triangle is a positive triangle,
a collector of the first switching tube is connected to a positive pole of the first capacitor, and an emitter of the second switching tube is connected to a negative pole of the first capacitor, a collector of the second switching tube is connected to an emitter of the first switching tube and serves as the first AC output terminal.

4. The multi-level converter with triangle topology according to claim 2, wherein the triangle is a positive triangle,
the k-th capacitor is connected in series to a first edge of a $(k-1)$-th positive triangle towards downward, and a positive pole of the k-th capacitor is connected to a negative pole of the $(k-1)$-th capacitor;
the $(2k-1)$-th switching tube (S2) is connected in series to a second edge of a $(k-1)$-th positive triangle towards downward, and a collector of the $(2k-1)$-th switching tube is connected to an emitter of the $(2k-3)$-th switching tube;
an emitter of the 2k-th switching tube is connected to a negative pole of the $(k-1)$-th capacitor, and a collector of the 2k-th switching tube is connected to an emitter of the $(2k-1)$-th switching tube and serves as the k-th AC output terminal.

5. The multi-level converter with triangle topology according to claim 4, wherein:
each switching tube provided on the third edge of each layer in the multi-level converter with positive triangle topology is configured as retaining its anti-parallel diode, and the converter comprises an inductor and a DC input power supply,
the inductor is connected in series to the n-th AC output terminal and then is connected to a negative pole of the DC input power supply, a positive pole of the DC input power supply is connected to a positive pole of the DC bus; the positive pole and a negative pole of the DC bus are serves as a DC output port, and input voltage and output voltage correspond to a same positive pole.

6. The multi-level converter with triangle topology according to claim 4, wherein:
each switching tube provided on the third edge of each layer in the multi-level converter with positive triangle topology is configured as retaining its anti-parallel diode, and the converter comprises an inductor and a DC output capacitor,
the inductor is connected in series to the n-th AC output terminal and then is connected to a positive pole of the DC output capacitor, a negative pole of the DC output capacitor is connected to a negative pole of the DC bus; a positive pole and the negative pole of the DC bus are serves as a DC input port, and input voltage and output voltage correspond to a same negative pole.

7. The multi-level converter with triangle topology according to claim 4, wherein two switching tubes in each layer are controlled in a complementary way.

8. The multi-level converter with triangle topology according to claim 7, wherein:
the (2k−3)-th switching tube is turned off prior to the (2k−1)-th switching tube, and the (2k−2)-th switching tube is turned on prior to the 2k-th switching tube;
the (2k−1)-th switching tube is turned on prior to the (2k−3)-th switching tube, and the 2k-th switching tube is turned off prior to the (2k−2)-th switching tube.

9. The multi-level converter with triangle topology according to claim 8, wherein:
the level is output as nE when all the switching tubes on the second edges from the first layer to the n-th layer are turned on and all switching tubes on the third edges from the first layer to the n-th layer are turned off;
the level is output as (n−k)E when k switching tubes on the second edges from the first layer to the k-th layer are turned off and (n−k) switching tubes on the second edges from the (k+1)-th layer to the n-th layer are turned on;
the level is output as 0 when all switching tubes on the second edges from the first layer to the n-th layer are turned off and all switching tubes on the third edges from the first layer to the n-th layer are turned on.

10. A control method of the multi-level converter with triangle topology according to claim 4, comprising:
controlling turning on or turning off of two switching tubes in each layer in a complementary way, wherein, the (2k−3)-th switching tube is turned off prior to the (2k−1)-th switching tube, and the (2k−2)-th switching tube is turned on prior to the 2k-th switching tube; the (2k−1)-th switching tube is turned on prior to the (2k−3)-th switching tube, and the 2k-th switching tube is turned off prior to the (2k−2)-th switching tube;
outputting a level of nE when all the switching tubes on the second edges from the first layer to the n-th layer are turned on and all switching tubes on the third edges from the first layer to the n-th layer are turned off;
outputting a level of (n−k)E when k switching tubes on the second edges from the first layer to the k-th layer are turned off and (n−k) switching tubes on the second edges from the (k+1)-th layer to the n-th layer are turned on;
outputting a level of 0 when all switching tubes on the second edges from the first layer to the n-th layer are turned off and all switching tubes on the third edges from the first layer to the n-th layer are turned on.

11. The multi-level converter with triangle topology according to claim 2, wherein the triangle is an inverted triangle,
an emitter of the first switching tube is connected to a negative pole of the first capacitor, and a collector of the second switching tube is connected to a positive pole of the first capacitor, an emitter of the second switching tube is connected to a collector of the first switching tube and serves as the first AC output terminal.

12. The multi-level converter with triangle topology according to claim 2, wherein the triangle is an inverted triangle,
the k-th capacitor is connected in series to a first edge of a (k−1)-th inverted triangle towards upward, and a negative pole of the k-th capacitor is connected to a positive pole of the (k−1)-th capacitor;
the (2k−1)-th switching tube is connected in series to a second edge of the (k−1)-th inverted triangle towards upward, and an emitter of the (2k−1)-th switching tube is connected to a collector of the (2k−3)-th switching tube;
a collector of the 2k-th switching tube is connected to a positive pole of the k-th capacitor, and an emitter of the 2k-th switching tube is connected to a collector of the (2k−1)-th switching tube and serves as the k-th AC output terminal.

13. The multi-level converter with triangle topology according to claim 12, wherein:
each switching tube provided on the third edge of each layer in the multi-level converter with inverted triangle topology is configured as retaining its anti-parallel diode, and the converter comprises an inductor and a DC input power supply,
the inductor is connected in series to the n-th AC output terminal and then is connected to a positive pole of the DC input power supply, a negative pole of the DC input power supply is connected to a negative pole of the DC bus; a positive pole and the negative pole of the DC bus are serves as a DC output port, and input voltage and output voltage correspond to a same negative pole.

14. The multi-level converter with triangle topology according to claim 12, wherein:
each switching tube provided on the third edge of each layer in the multi-level converter with inverted triangle topology is configured as retaining its anti-parallel diode, and the converter comprises an inductor and a DC output capacitor,
the inductor is connected in series to the n-th AC output terminal and then is connected to a negative pole of the DC output capacitor, a positive pole of the DC output capacitor is connected to a positive pole of the DC bus; the positive pole and a negative pole of the DC bus are serves as a DC input port, and input voltage and output voltage correspond to a same positive pole.

15. The multi-level converter with triangle topology according to claim 12, wherein two switching tubes in each layer are controlled in a complementary way.

16. The multi-level converter with triangle topology according to claim 15, wherein:
the (2k−3)-th switching tube is turned off prior to the (2k−1)-th switching tube, and the (2k−2)-th switching tube is turned on prior to the 2k-th switching tube;
the (2k−1)-th switching tube is turned on prior to the (2k−3)-th switching tube, and the 2k-th switching tube is turned off prior to the (2k−2)-th switching tube.

17. The multi-level converter with triangle topology according to claim 16, wherein:
- the level is output as 0 when all the switching tubes on the second edges from the first layer to the n-th layer are turned on and all switching tubes on the third edges from the first layer to the n-th layer are turned off;
- the level is output as kE when k switching tubes on the second edges from the first layer to the k-th layer are turned off and (n–k) switching tubes on the second edges from the (n–k+1)-th layer to the n-th layer are turned on;
- the level is output as nE when all switching tubes on the second edges from the first layer to the n-th layer are turned off and all switching tubes on the third edges from the first layer to the n-th layer are turned on.

18. A control method of the multi-level converter with triangle topology according to claim 12, comprising:
- controlling turning on or turning off of two switching tubes in each layer in a complementary way, wherein, the (2k–3)-th switching tube is turned off prior to the (2k–1)-th switching tube, and the (2k–2)-th switching tube is turned on prior to the 2k-th switching tube; the (2k–1)-th switching tube is turned on prior to the (2k–3)-th switching tube, and the 2k-th switching tube is turned off prior to the (2k–2)-th switching tube;
- outputting a level of 0 when all the switching tubes on the second edges from the first layer to the n-th layer are turned on and all switching tubes on the third edges from the first layer to the n-th layer are turned off;
- outputting a level of kE when k switching tubes on the second edges from the first layer to the k-th layer are turned off and (n–k) switching tubes on the second edges from the (n–k+1)-th layer to the n-th layer are turned on;
- outputting a level of nE when all switching tubes on the second edges from the first layer to the n-th layer are turned off and all switching tubes on the third edges from the first layer to the n-th layer are turned on.

* * * * *